(12) United States Patent
Giannasca

(10) Patent No.: US 7,367,279 B2
(45) Date of Patent: May 6, 2008

(54) STACKABLE SUPPORT SHOCK ABSORBING PLATFORM

(76) Inventor: John Giannasca, P.O. Box 14, Point Lookout, NY (US) 11569

( * ) Notice: Subject to any disclaimer, the term of this patent is extended or adjusted under 35 U.S.C. 154(b) by 0 days.

(21) Appl. No.: 10/907,332

(22) Filed: Mar. 29, 2005

(65) Prior Publication Data

US 2006/0219150 A1 Oct. 5, 2006

(51) Int. Cl.
*B63B 17/00* (2006.01)

(52) U.S. Cl. ...................... 114/343; 114/364

(58) Field of Classification Search ............... 114/343, 114/364, 363; 297/217.1, 423.2, 423.21
See application file for complete search history.

(56) References Cited

U.S. PATENT DOCUMENTS

| | | | |
|---|---|---|---|
| RE16,323 E * | 4/1926 | Weber | |
| 1,970,630 A | 8/1934 | Searing | |
| 2,059,059 A | 10/1936 | Thompson | |
| 2,277,171 A | 3/1942 | Traylor | |
| 2,604,146 A * | 7/1952 | Martin | 297/423.22 |
| 2,901,208 A | 8/1959 | Jones | |
| 2,978,243 A * | 4/1961 | Gabrielson | 472/14 |
| 3,203,670 A | 8/1965 | Farris | |
| 3,351,314 A * | 11/1967 | Hirsch et al. | 248/563 |
| 3,428,976 A * | 2/1969 | Robinson | 114/363 |
| 3,628,204 A * | 12/1971 | Hoffman, Jr. | 114/343 |
| 3,701,226 A | 10/1972 | Fulcher | |
| 3,796,282 A | 3/1974 | Denier et al. | |
| 3,961,681 A | 6/1976 | Fisher | |
| 4,151,804 A | 5/1979 | Wache et al. | |
| 4,232,901 A | 11/1980 | Harrington et al. | |
| 4,930,435 A | 6/1990 | Newman | |
| 5,066,001 A * | 11/1991 | Wilkinson | 482/52 |
| 5,771,816 A | 6/1998 | Zaguroli, Jr. | |
| 5,772,559 A * | 6/1998 | Sithole | 482/52 |
| 6,244,205 B1 * | 6/2001 | Saccocio | 114/343 |
| 6,698,371 B1 | 3/2004 | Stoltzfus | |
| 6,763,774 B1 | 7/2004 | Ranieri et al. | |
| 2005/0101444 A1 * | 5/2005 | Dadbeh | 482/52 |

* cited by examiner

*Primary Examiner*—Sherman Basinger
(74) *Attorney, Agent, or Firm*—Collard & Roe, P.C.

(57) ABSTRACT

A system for supporting a user in a shock absorbing manner over a base floor comprising at least one base platform selectively secured the base floor. There is at least one additional platform wherein this platform can be stacked on top of the base platform. This additional platform can comprise the following elements: a flexible elastic shock absorbing element which may be in the form of any shock absorbing material such as rubber; and a substantially rigid housing disposed around the flexible element. This substantially rigid housing may be in the form of any substantially rigid material and may for example be a polyurethane foam or a blow molded plastic. At least a portion of the shock absorbing element can fit inside of this substantially rigid housing in a recessed region. There is also an additional layer of rigid material which is secured to this shock absorbing element in the form of a flexible layer. This additional layer of rigid material may also be in the form of rigid foam. In this case the flexible shock absorbing layer supports the rigid housing above the rigid foam layer.

23 Claims, 8 Drawing Sheets

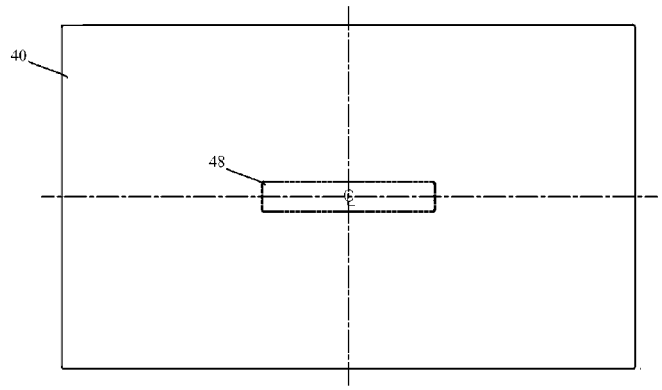
FIG. 5A
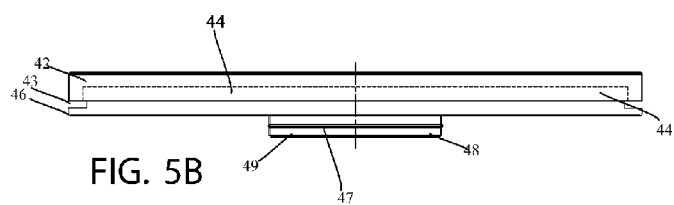
FIG. 5B
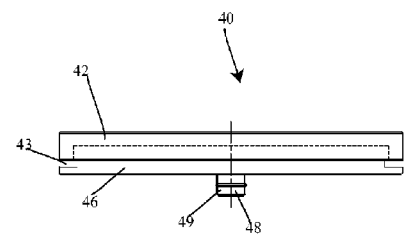
FIG. 5C
FIG. 6
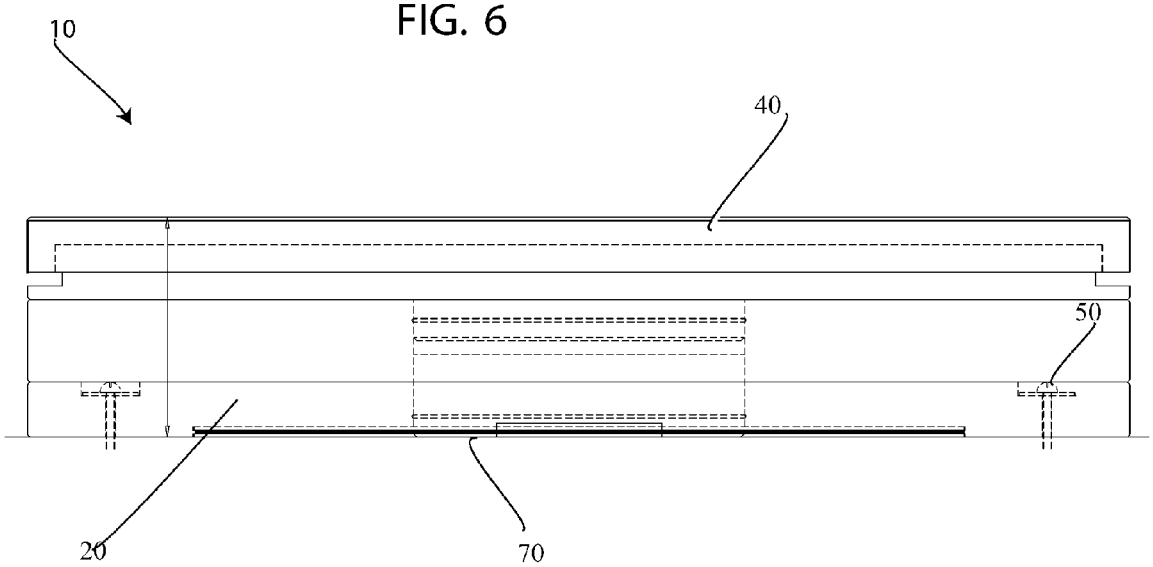

STACKABLE SUPPORT SHOCK ABSORBING PLATFORM

BACKGROUND OF THE INVENTION

Field of the Invention

The present invention relates to a stackable support platform wherein this support platform can be used as a shock absorbing platform for users. This type of platform can be used to support a user over a platform that incurs shocks such as a boat deck on a motorboat.

SUMMARY OF THE INVENTION

The invention relates to a system for supporting a user in a shock absorbing manner over a base floor comprising at least one base platform selectively secured the base floor. There is at least one additional platform wherein this platform can be stacked on top of the base platform. This additional platform can comprise the following elements: a flexible elastic shock absorbing element which may be in the form of any shock absorbing material such as rubber; and a substantially rigid housing disposed around the flexible element. This substantially rigid housing may be in the form of any substantially rigid material and may for example be a polyurethane foam or a blow molded plastic. At least a portion of the shock absorbing element can fit inside of this substantially rigid housing in a recessed region. There is also an additional layer of rigid material which is secured to this shock absorbing element in the form of a flexible layer. This additional layer of rigid material may also be in the form of rigid foam. In this case the flexible shock absorbing layer supports the rigid housing above the rigid foam layer.

A top surface of the substantially rigid housing may be in the form of a non-skid surface.

This system can also be used to adjust the level at which a person stands on a base floor such as a deck of a boat. Therefore, this system can further comprise at least one intermediate stacking element for stacking on top of the base platform. Additional intermediate stacking platforms can be used to stack this standing platform as high as a user would want.

To secure the base layer to the base floor there can be at least one base bracket that is fastened to the base floor for allowing the base layer having a flange region to fasten to the floor.

For example, the base bracket is in the form of a bracket that has at least one flange, wherein the base platform contains a flange which can mate with a flange region on the metal bracket so that the base platform can be secured to the base.

There can also be a strap for securing the additional platform onto the base platform, wherein this strap is securely wrapped around the additional platform and the base platform.

The additional layer can also include an additional substantially rigid layer which is coupled to the flexible shock absorbing layer opposite the housing. This flexible shock absorbing layer may extend out from the housing a sufficient distance to space a bottom surface of the rigid housing from the oppositely spaced substantially rigid layer.

The base platform can have at least one recessed region, and the additional platform can have at least one plug extending out from the additional platform, wherein the plug and the recessed region form a tongue and groove connection, wherein the extending section of this plug can extend into the recessed region the base platform. The optional plug can also optionally contain a rib extending around the plug. The rib can be in the form of a rigid material or in the form of a rubber gasket.

The base platform can have on one face a recessed region for receiving a hook and loop fastener which can be used to secure the base platform to the base floor. The hook and loop fastener can be in the form of two strips with one strip comprising hooks on one side and an adhesive on an opposite side and another strip comprising loops on one side and an adhesive on another side wherein one of the strips is fastened to the base platform and the other strip is fastened to the base floor, such that the base platform can be selectively secured to the base floor using this fastener. This fastener is recessed inside of the base platform so that this base platform maintains its stable foundation and contacts the base floor with a substantially larger surface area of the bottom surface of the base platform. Otherwise, the strips of the hook and loop fastener would elevate this base platform off of the base floor creating an unstable platform.

One of the benefits of this system is that it is designed to be easily securable to a base floor such as a motorboat deck. With the hook and loop fastening system, this device can also be easily removed and stored away so that it does not interfere with a persons movement across a deck.

This system also has the advantage of being stackable with intermediate levels being stacked one on top of the other to elevate the top platform above the base platform to a particular height. This feature is beneficial because if a first user is very tall that user would not need so many intermediate stackable levels. However if another user was not as tall and wanted to have increased visibility above a console and/or steering wheel, that user could simply stack each level, first on the base layer, one on top of the other to the desired height.

Another beneficial feature of this invention is that the flexible shock absorbing layer in the additional layer provides absorbs some of the energy of any dramatic movements from a motorboat such as bouncing up and down in choppy seas while at moderate to high speeds. During these periods of shocks, the rigid outer housing would compress down on top of the oppositely spaced rigid layer such that the intermediate flexible layer would absorb much of the energy of the shock. When these dramatic stresses are removed from this component then the housing would be elevated back up above the bottom rigid layer.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 5A is a top view of the top board or top layer;

FIG. 5B is a front view of the top board shown in FIG. 5A;

FIG. 5C is a side view of the side board rotated 90 degrees;

FIG. 6 is a front side view of a first assembly of the device;

DETAILED DESCRIPTION OF PREFERRED EMBODIMENTS

Figure 1:
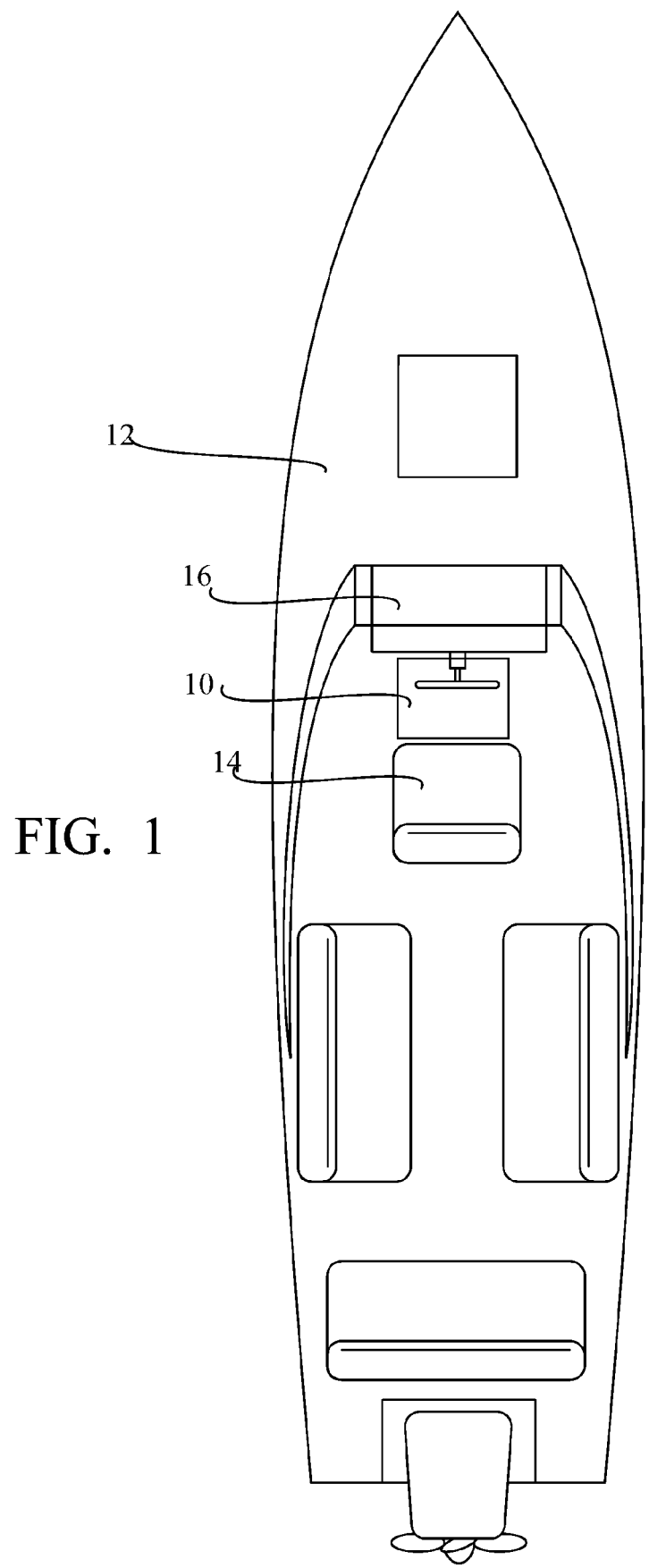
FIG. 1 is a top view of a first implementation of the device on a motorboat.

Turning now in detail to the drawings, FIG. 1 is a top view of a first implementation of the device 10 on a motorboat 12. In this case, this type of a multi-layer shock absorbing platform may be placed or mounted on any surface such as a boat deck. With the example shown in FIGS. 1 and 2 this multi-layer shock absorbing platform is disposed between a seat 14 and a console unit 16 on motorboat 12.

Figure 2A:
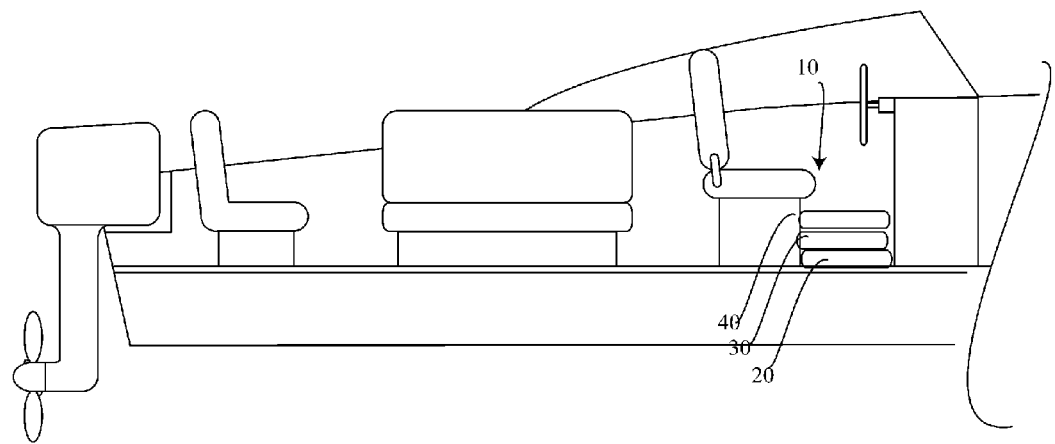
FIG. 2A is a side view of FIG. 1 showing the implementation of this device.
Figure 2B:
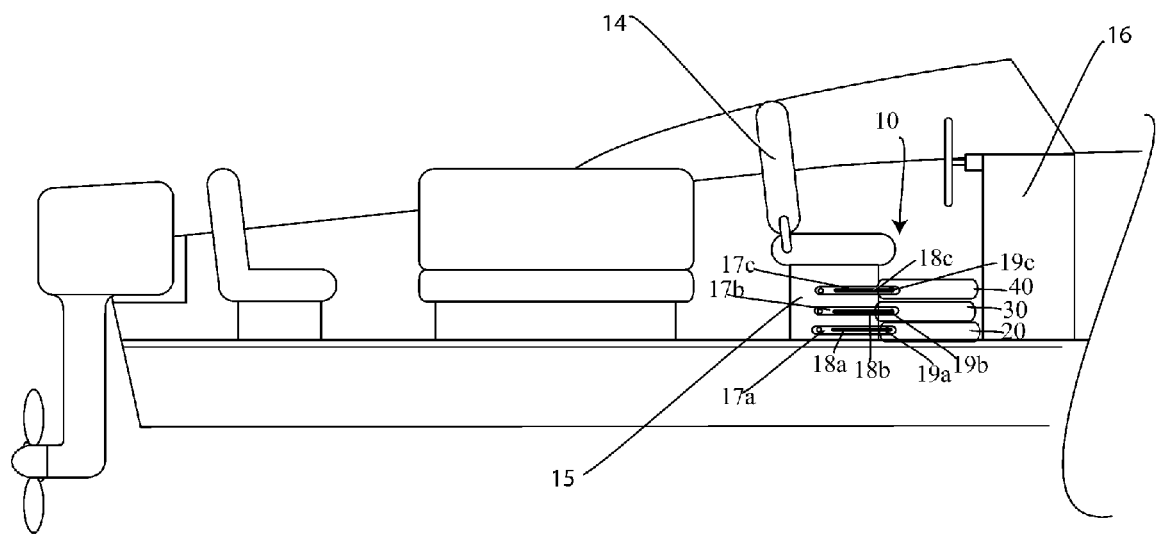
FIG. 2B is an alternative embodiment of the design shown in FIG. 2A.

FIG. 2A is a side view of FIG. 1 showing the implementation of this device such that as this device is mounted it can be stacked higher and higher to allow a user to see over a console unit. This device may be made for example in many different layers such as a bottom layer 20, a middle or elevating layer 30 and a top layer 40. These boards or layers 20, 30 and 40 can be stored on a side portion of a boat or as shown in FIG. 2B pulled out from a compartment 15 underneath seat 14. If the boards are pulled out, they can be slid on adjustable tracks 17a, 17b, 17c, each having a respective slider 18a, 18b, 18c allowing a sliding hinge to slide therein, wherein each track is connected to compartment 15 at one end via a hinge and at an opposite end to each board via sliding hinges 19a, 19b, 19c respectively to allow the height of each board to be adjusted.

Figure 3A:
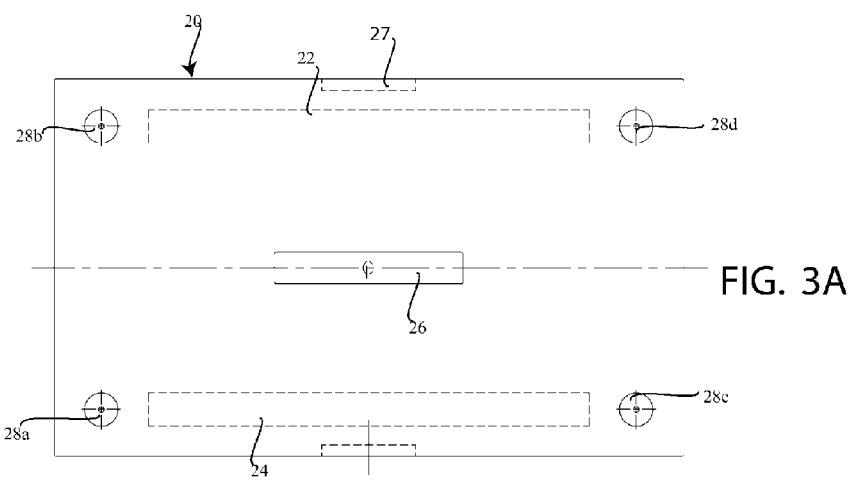
FIG. 3A is a top view of a bottom or base layer or board of the device.

FIG. 3A is a top view of a bottom or base layer or board 20 of device 10. This bottom board can be substantially rectangular in shape and can be made from any type of substantially rigid material such as a plastic or polyurethane foam. In this case, the bottom board 20 includes a plurality of recesses and or holes disposed therein. This set of recesses includes a first and a second recess 22 and 24 respectively for receiving a fastening system such as strips relating to a hook and loop fastener. These two recesses 22 and 24 can be substantially rectangularly shaped and are spaced apart from each other in a parallel manner and are disposed adjacent to side edges of board 20. There is also a central cut out 26 which can be substantially rectangularly shaped and which is positioned in a center region of the board. There are also four optional screw holes 28 including holes 28a, 28b, 28c, 28d, disposed in corner regions of board 20.

Figure 3B:
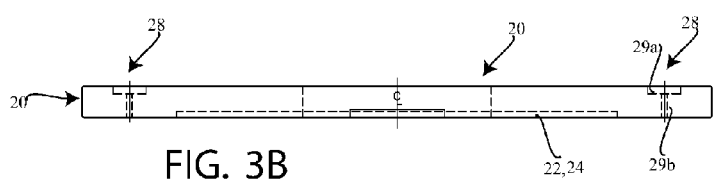
FIG. 3B is a front view of the bottom layer shown in FIG. 3A.

FIG. 3B is a front view of the bottom layer shown in FIG. 3A, wherein in this view, recessed regions 22, and 24 are shown as recessed only a portion of a distance into board 20. In addition, screw holes 28 include a recessed or sunken region 29a and a drill hole 29b to receive both a screw head and a screw shaft.

Figure 3C:
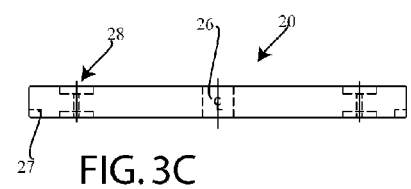
FIG. 3C is a side view of the bottom layer shown in FIG. 3A.

FIG. 3C is a side view of the bottom layer shown in FIG. 3A wherein this view is a view of board 20 rotated approximately 90 degrees. This view shows that central hole or cut out 26 extends entirely through board 20. In addition there are also additional recesses 27 which can be used to receive a cleat mounted on a deck so that this board can be easily mounted on a deck.

Figure 4A:
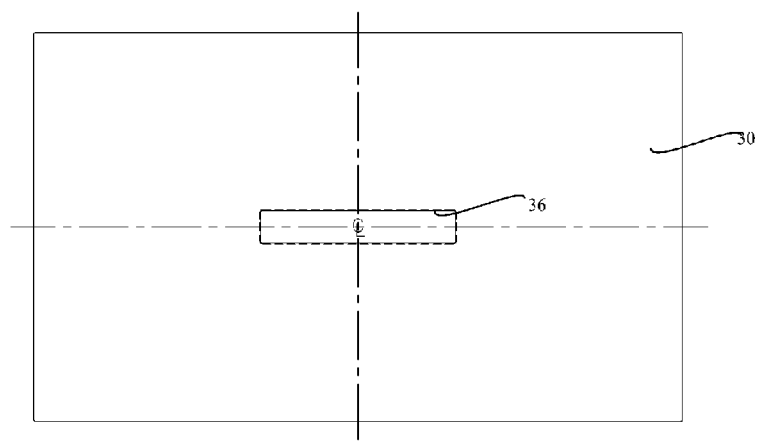
FIG. 4A is a top view of a middle board or middle layer.
Figure 4B:
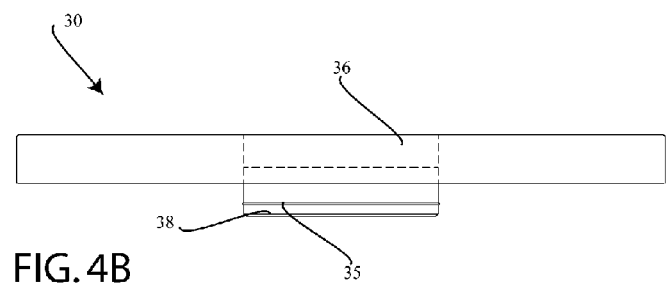
FIG. 4B is a front side view of the middle board shown in FIG. 4A.
Figure 4C:
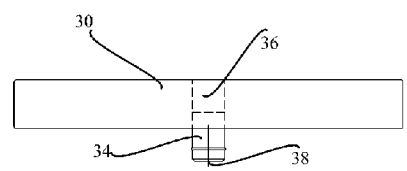
FIG. 4C is a side view of the middle board shown in FIG. 4A.

FIG. 4A is a top view of a middle board or middle layer 30 wherein this middle board is in the form of a substantially rectangular board having an inner plug 34 that is also substantially rectangular extending down. Inner plug 34 can essentially be formed from a substantially rectangular cut out 36 of board 30, wherein this plug can be cut out and then slid down as shown in FIG. 4B and then reattached in its displaced position. This inner plug 34 can also include a rib 35 extending around the plug, wherein this rib 35 is disposed substantially adjacent to a bottom edge of plug 34. A bottom edge of plug 30 can also be formed as a chamfered edge 38 as shown in FIG. 4C which allows this plug to fit inside of central cut out 26 of bottom board 20.

FIG. 5A is a top view of the top board or top layer 40, this view shows that this top board is substantially rectangular in shape. As shown in FIG. 5B and in FIG. 5C this board is a multi-layer board including a top housing layer 42, a middle soft shock absorbing foam layer 44 and a bottom layer 46 made from a rigid material such as rigid foam. This bottom layer 46 can have a substantially flat surface in contact with the shock absorbing foam layer 44 and wherein the opposite surface can have a plug 48 extending out therefrom. This plug 48 can be of any desired shape but is shown here by way of example as a substantially rectangular plug having a rib 47 extending around a circumference of plug 48. This plug can also have a chamfered edge 49 (See FIG. 5C) which allows plug 49 to easily guide into substantially rectangular cut out 34 of middle board 30. Once this plug 48 is being guided into cut out 34, rib 47 forms a secure friction fit so that this plug does not easily pull out from the other board.

FIG. 5B is a front view of the top board shown in FIG. 5A wherein this view also shows a gap 43 between rigid housing 42 and bottom layer 46. This gap is created by the shock absorbing foam layer 44 extending up into housing 42 to create a spacing distance between the two rigid layers. When this top layer 42 or bottom layer 46 is stressed with a sudden movement or force, some of the energy associated with this movement can be absorbed by middle layer 44, causing the two rigid layers to temporarily compress or move together.

FIG. 6 is a front side view of a first assembly of the device 10. In this view, the device is being applied as only two boards with a bottom board 20 mounting on a deck and with top shock absorbing board 40 inserting into bottom board 20. In this case, board 40 has plug 48 which fits inside of bottom board cut out 26 to form a friction fit connection via rib 47. In addition, an additional rib can also be shown wherein this additional rib is for additional frictional support.

Figure 7A:
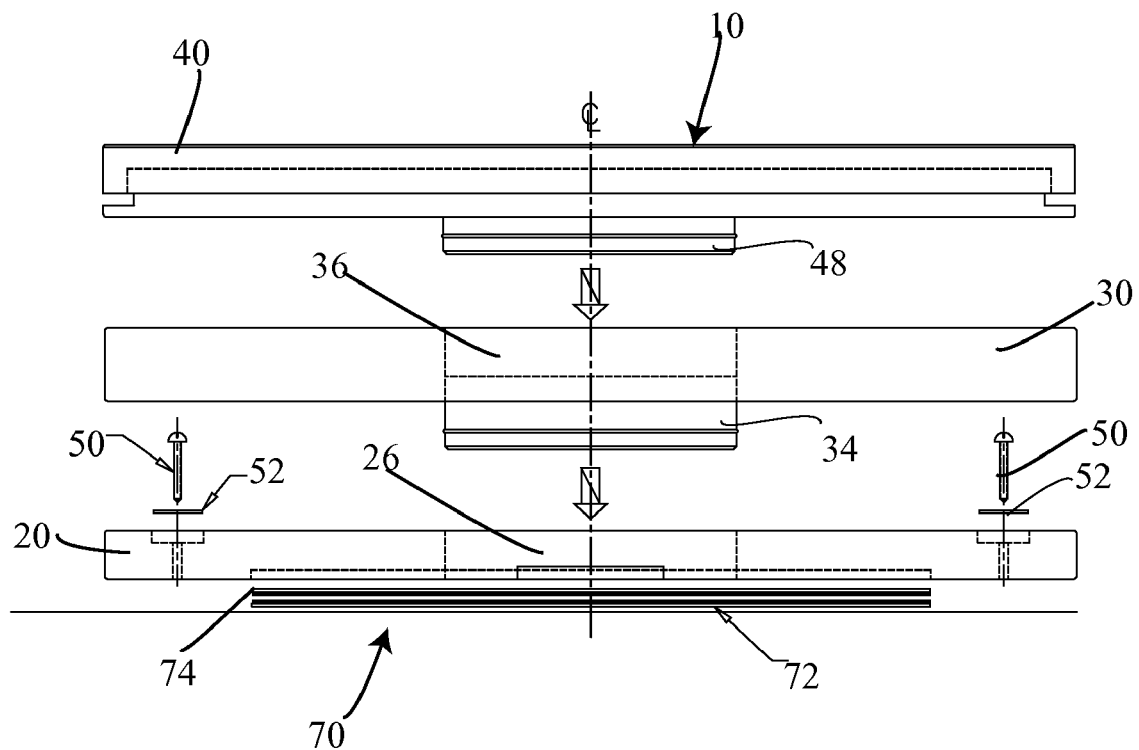
FIG. 7A is a side view of the second assembly of the device.
Figure 7B:
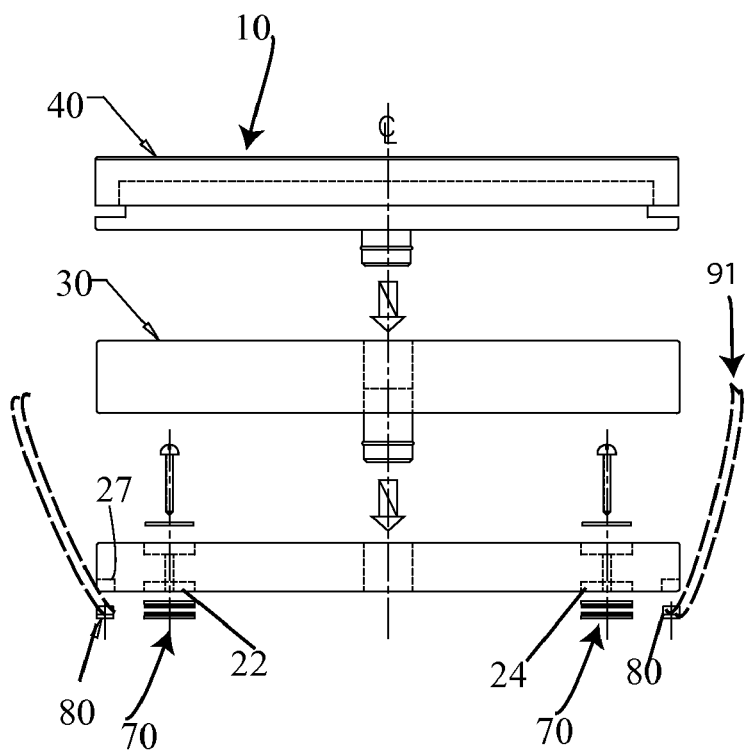
FIG. 7B is a front view of the second assembly of the device.

FIGS. 7a and 7b are side and front views, respectively, of the second assembly of the device, wherein this assembly view shows the assembly of three boards shown in FIGS. 4A-5C wherein bottom board 20 is first mounted on a deck, middle spacer board 30 is placed on top, and then finally top board 40 is mounted on middle spacer board 30. A plurality of screws 50 with washers 52 are used to mount this base or bottom board onto a bottom support surface 60 such as a boat floor.

This assembly can occur as follows: first the hook and loop fasteners/fastening system 70 is mounted wherein a first strip 72 is applied to a boat deck via an adhesive. The opposite strip 74 is then applied via an adhesive to the indents 22 and 24 in bottom board 20. Once the strips have been applied, bottom board 20 can be placed onto the bottom surface or boat deck so that this bottom board can be aligned. Next, for additional optional securing of the device, additional fasteners such as screws 50 can be inserted into countersunk openings 28 and secured via washers 52. In addition, brackets 80 for securing a hold down strap can be guided into recess 27 in bottom board 20. Next, once bottom board 20 is secure, middle board 30 is inserted using plug 34 into opening 26 to secure middle board 30 to bottom board 20. Rib 35 is frictionally guided into opening 26 to secure plug 34 therein. In addition plug 34 can be easily guided into opening 26 via a chamfered edge 38.

Next, top board 40 is inserted into middle board 30. With this insertion plug 48 is inserted into opening 36 such that chamfered edge 49 of plug 48 guides plug into opening 36. In addition, friction rib 47 can be used to secure top board 40 into middle board 30. Once this entire device has been secured down, a strap 91 can be wrapped around all of the boards, to secure these boards together. In addition, this strap can be secured to the base or floor via bracket 80.

Figure 8A:
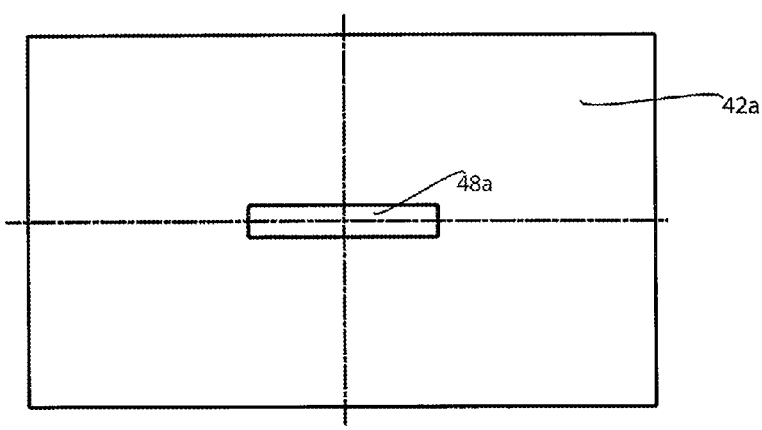
FIG. 8A is a top view of another embodiment of a top board.
Figure 8B:
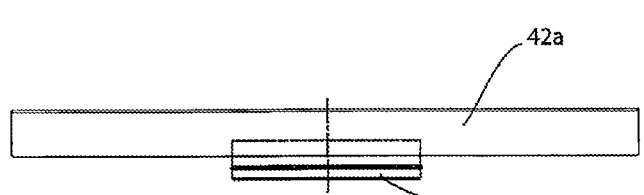
FIG. 8B is a side view of the embodiment shown in FIG. 8A.
Figure 8C:
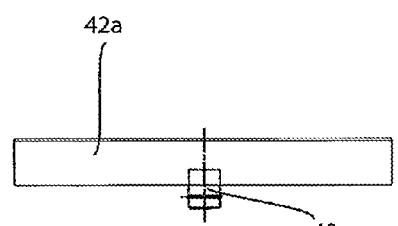
FIG. 8C is a front view of the embodiment shown in FIG. 8A.

In another embodiment FIG. 8A shows a top view of a solid top board made from a single solid section of shock absorbing material 42a. In this case the single section of shock absorbing material can be in the form of a rubber, foam, or other type of forgiving material that can be used to support a user in a shock absorbing manner. This device can also be attached to a bottom board via a plug 48a which is similar to plug 48. This plug 48a can then fit inside of a board cut out 26 such that top board 42a would then be snugly secured to a bottom board 20.

Figure 9:
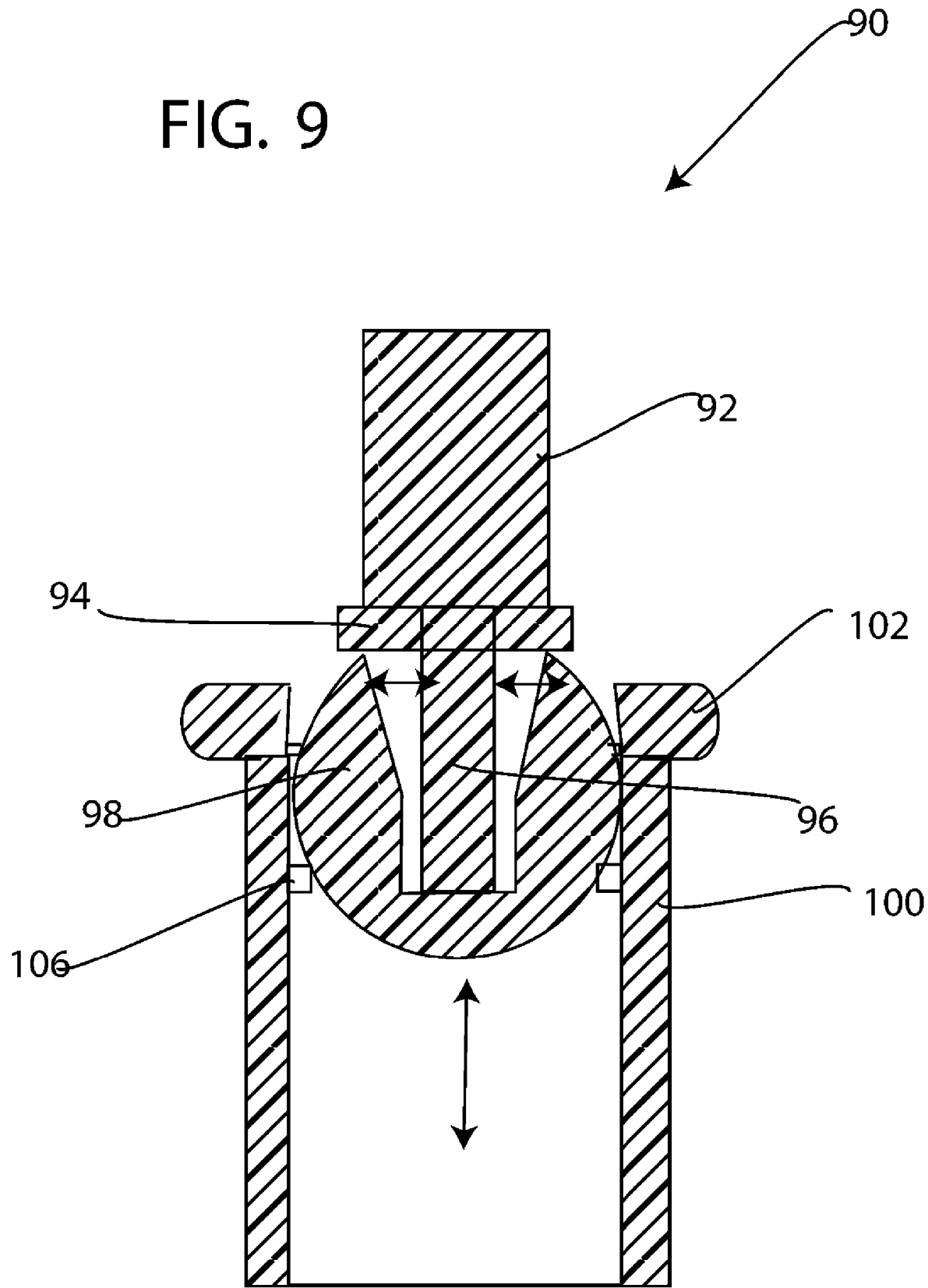
FIG. 9 is a side cross sectional view of another embodiment of the connecting elements for the invention.

In addition other optional components may be associated with this design, for example, instead of using a substantially rectangular shaped plug 48a, there can be another type of system which involves a round plug which can then conversely fit into a round hole in the base or bottom board cut out. FIG. 9 shows a connection joint that can be formed from a ball and socket joint between a top board and a bottom board. Essentially the top board would have the collapsible ball joint and the bottom board would have the open socket.

FIG. 9 shows a cross sectional view of a ball and socket joint 90 which includes a shaft 92 which would connect to a top board, a plate 94 which is coupled to the shaft, a second shaft 96 connected to plate 94 and continuous with first shaft 92. There is also a collapsible ball 98 which can connect with shaft 96 and then be pressed in to snap into socket 100. Socket 100 can be coupled to a hole in bottom board 20 and includes a top plate rim 102 which allows it to be pressed into a hole in a bottom board and a flange 106 which allows ball 98 to snap in and to have it frictionally secured into socket 100. In this way, top board 40 can be secured to bottom board 20 in an alternative manner.

Accordingly, while a few embodiments of the present invention have been shown and described, it is to be understood that many changes and modifications may be made thereunto without departing from the spirit and scope of the invention as defined in the appended claims.

What is claimed is:

1. A system for supporting a user over a boat deck comprising:
   a) at least one base disposed on and coupled to said boat deck behind a helm of a boat and disposed between a seat and a console unit on a boat;
   b) at least one additional platform wherein said at least one additional platform can be stacked on top of said at least one base, and at least one flexible elastic shock absorbing element coupled to said at least one additional platform;
   wherein said at least one base has at least one recessed region, and said at least one additional platform has at least one extending section, wherein when said at least one additional platform is coupled to said at least one base, said at least one extending section extends into said at least one recessed region of said base, and such that said at least one additional platform is stacked upon said base to provide additional elevation for a user above said boat deck to provide a height adjustable support for a user positioned adjacent to the helm of a boat to allow a user to stand and operate at the helm of a boat.

2. The system as in claim 1, further comprising at least one intermediate stacking element for stacking on top of said at least one base, wherein said at least one additional platform can be stacked on top of said at least one intermediate stacking element.

3. The system as in claim 2, wherein said at least one intermediate stacking platform has at least one recessed region, and said at least one intermediate stacking platform has at least one extending section, wherein said at least one extending section extends into said at least one recessed region of said base.

4. The system as in claim 1, wherein said at least one extending section on said at least one additional platform has a laterally extending coupler to keep said at least one extending section in said recessed region of said base.

5. The system as in claim 4, wherein said laterally extending coupler is in the form of a rib extending out from said extending section.

6. The system as in claim 4, wherein said laterally extending coupler is in the form of a collapsible ball, and wherein said recessed region of said base section is a socket, wherein said collapsible ball is snapped into an associated socket to lock said at least one additional platform into said base.

7. The system as in claim 6, wherein said socket further comprises a flange for frictionally securing said collapsible ball into said socket.

8. The system as in claim 1, wherein said at least one additional platform is made from a substantially rigid housing that is made from a composite foam material.

9. The system as in claim 8, wherein said at least one base and said substantially rigid housing can be blow molded.

10. The system as in claim 1, further comprising at least one base bracket for securing said at least one base to said boat deck.

11. The system as in claim 10, wherein said at least one base bracket is in the form of a bracket that has at least one flange, and wherein said at least one base contains a flange which can mate with said base bracket so that said at least one base bracket can be secured to said base.

12. The system as in claim 11, wherein said base can be slid onto said at least one base bracket so that said flange on said bracket mates with said flange on said base to secure said base onto said boat deck.

13. The system as in claim 1, further comprising a strap for securing said at least one additional platform onto said base, wherein said strap is securely wrapped around said at least one additional platform and said at least one base.

14. The system as in claim 1, wherein said at least one additional platform further comprises a non-skid surface disposed on a top surface of said at least one additional platform.

15. The system as in claim 1, wherein said at least one additional platform further comprises:
   a substantially rigid housing disposed around said flexible elastic shock absorbing element wherein said substantially rigid housing is stackable on said base and wherein said flexible element contains a first inner region extending up to a first height and a second lower region extending up to a lower second height wherein said substantially rigid housing rests on said first inner region in an uncompressed state and can be selectively compressed so as to contact said second lower region when said substantially rigid housing is in a compressed state, and a substantially rigid foam section which is coupled to said flexible element opposite said substantially rigid housing to form a multi-layer component.

16. The system as in claim 15, wherein said at least one additional platform further comprises at least one substantially rigid plug.

17. The system as in claim 16, wherein said substantially rigid plug further comprises at least one rib extending around said substantially rigid plug, said at least one rib is for securing said substantially rigid plug inside of a recess in a hole in a top region of said at least one base.

18. The system as in claim 1, wherein said at least one additional platform further comprises at least one substantially rigid plug.

19. The system as in claim 1, further comprising at least one fastener for fastening said base to the boat deck in the region of a second recessed region.

20. The system as in claim 19, wherein said at least one fastener is in the form of a hook and loop fastener, disposed in said second recessed region of said base.

21. The system as in claim 1, further comprising at least one hinge mounted bracket, having a first hinge coupled to a seat compartment, and a second slidable hinge coupled to said at least one base such that said at least one base can slide out of said seat compartment and wherein said first hinge and said second slidable hinge can rotate to set a height for said at least one base.

22. A system for supporting a user over a boat deck comprising:
   a) at least one base selectively secured to said boat deck behind the helm of a boat, and comprising:
      i) a top surface having a plurality of recesses with at least one recess for receiving a substantially rigid fastener extending through said base to reside in said base in a sunken manner, and at least one additional recess substantially centrally disposed;
      ii) a bottom surface having at least one recess including at least one recess for receiving a strap extending up from the boat deck, at least one recess for receiving at least one fastening plate for allowing said at least one rigid fastener to be secured to the boat deck, and at least one recessed region for receiving an additional fastener in the form of a hook and loop fastener in the form of at least two strips with at least one strip being fastened to said bottom surface and at least one strip being fastened to said boat deck;
   b) at least one additional platform wherein said at least one additional platform can be stacked on top of said at least one base, wherein said at least one additional platform comprises the following elements:
      i) a flexible elastic shock absorbing layer;
      ii) a substantially rigid housing having a recessed region and disposed around said flexible layer, such that said flexible elastic shock absorbing layer is disposed at least partially inside of said substantially rigid housing and is fastened to said substantially rigid housing via an adhesive;
      iii) a substantially rigid foam layer coupled to said flexible layer opposite to a side that said flexible layer is coupled to said substantially rigid housing; and
   c) a substantially rigid plug, coupled to and extending out from said substantially rigid foam layer, and having a rib extending out from a peripheral region on said plug, wherein said substantially rigid foam plug fits inside of said at least one additional recess substantially centrally disposed to secure said at least one additional platform to said at least one base to provide a height adjustable support for a user steering a boat.

23. A system for elevating a person above a boat deck comprising:
   a) at least one base coupled to the boat deck behind the helm of a boat wherein said at least one base has at least one recess for receiving an additional platform on top of said base;
   b) at least one coupling element coupled to said boat deck, said coupling element for securing said at least one base to the boat deck wherein when said at least one base is secured to the boat deck via said at least one coupling element a user can place himself on said base so as to be elevated above the boat deck wherein the system provides a height adjustable support for a user steering a boat;
   C) at least one additional platform wherein said at least one additional platform can be stacked on top of said at least one base,
   wherein said at least one base has at least one recessed region, and said at least one additional platform has at least one extending section, wherein when said at least one additional platform is coupled to said at least one base, said at least one extending section extends into said at least one recessed region of said base, and such that said at least one additional platform is stacked upon said base to provide additional elevation for a user above said boat deck to provide a height adjustable support for a user positioned adjacent to the helm of a boat to allow a user to stand and operate at the helm of a boat,
   wherein said at least one extending section on said at least one additional platform has a laterally extending coupler to keep said at least one extending section in said recessed region of said base.

* * * * *